Dec. 16, 1952     B. G. STÅLHEIM     2,621,645
STONE SAWING MACHINE
Filed Dec. 9, 1950     3 Sheets-Sheet 3
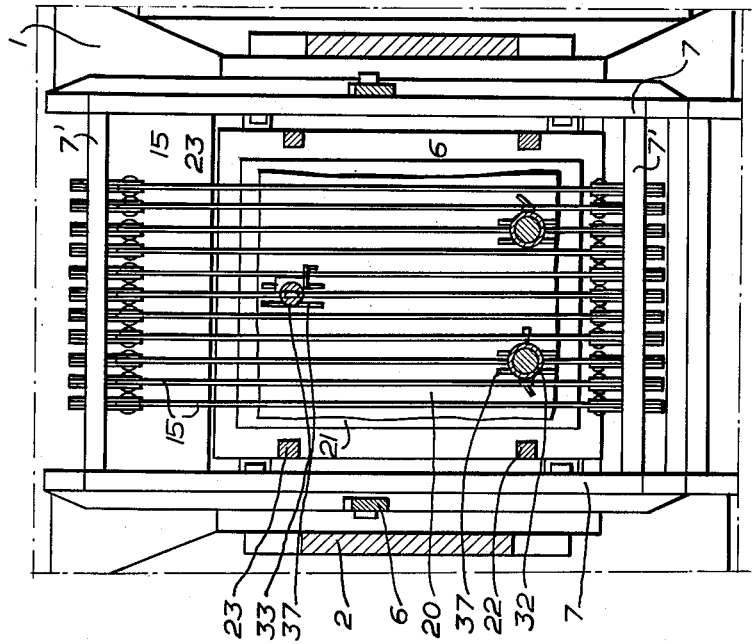
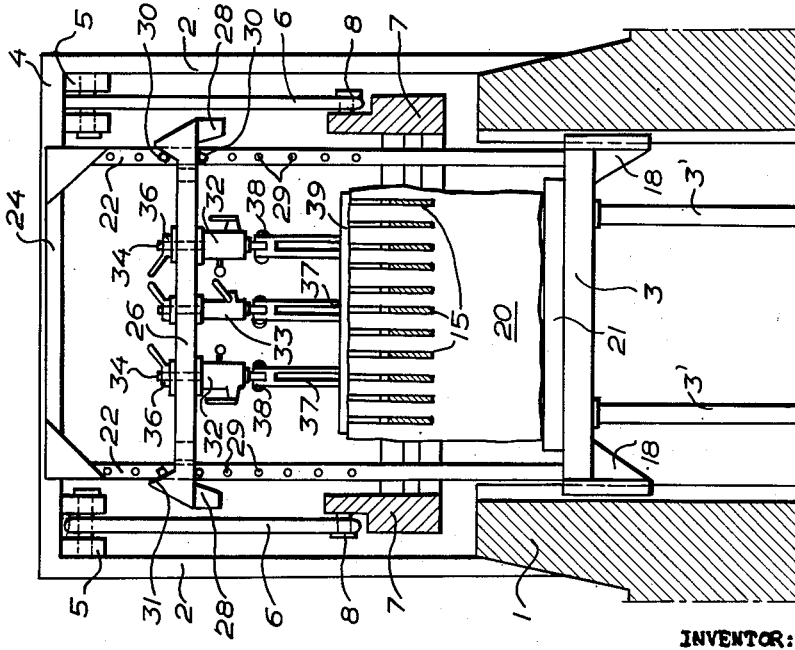
INVENTOR:
BROR G. STÅLHEIM
By [signature]
ATTORNEY Patented Dec. 16, 1952

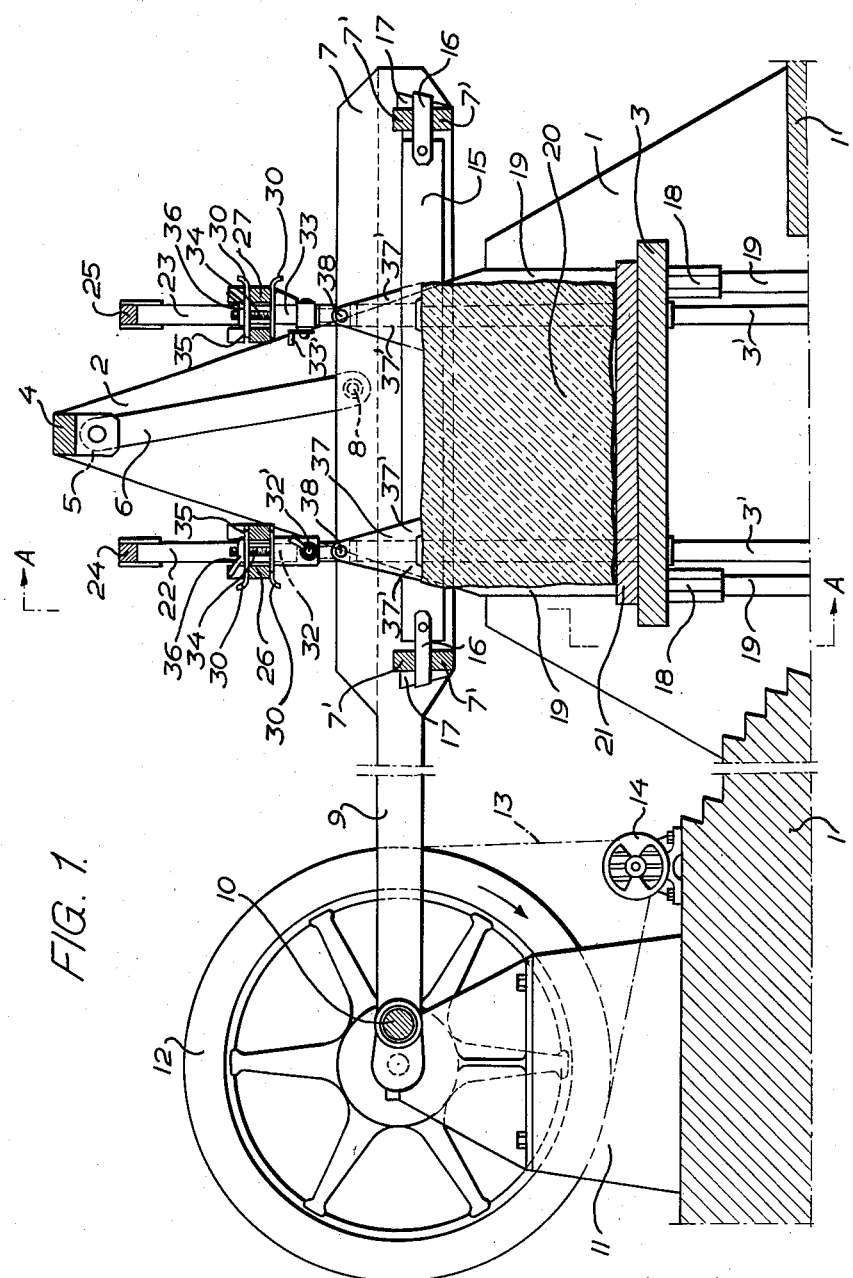

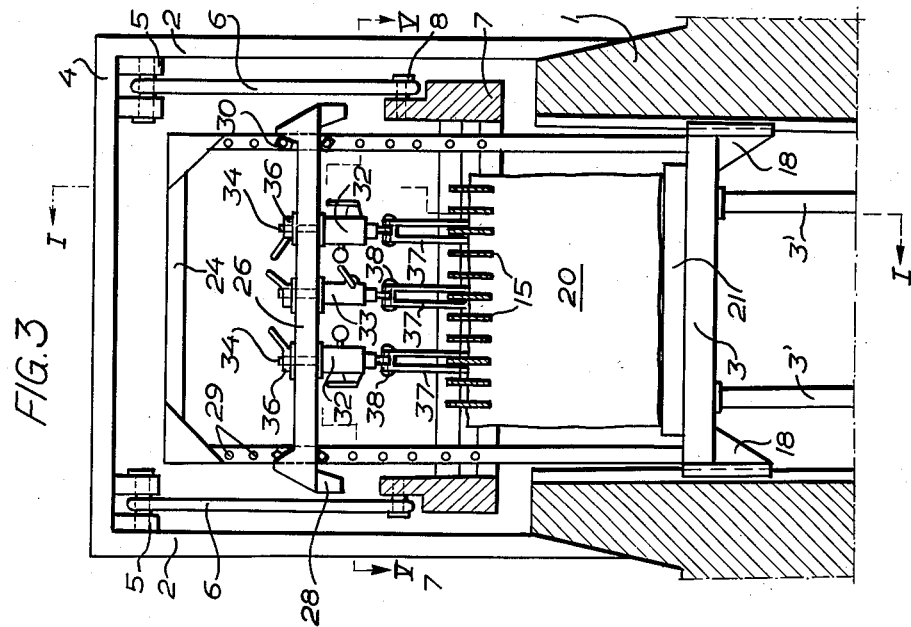
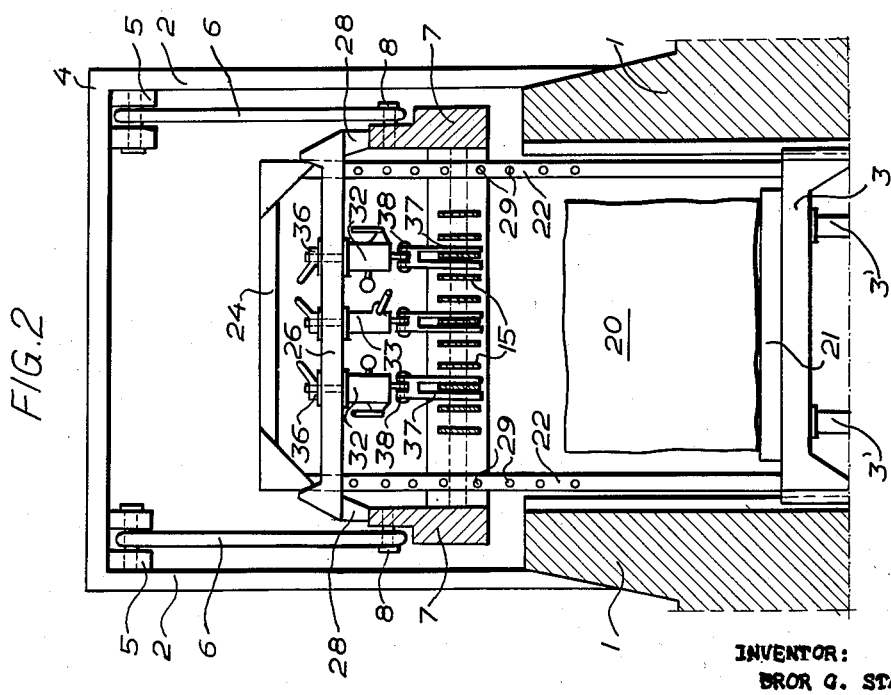

2,621,645

UNITED STATES PATENT OFFICE 2,621,645

STONE SAWING MACHINE

Bror G. Stålheim, Stockholm, Sweden

Application December 9, 1950, Serial No. 199,953
In Sweden July 22, 1949

4 Claims. (Cl. 125—16)

This invention relates to improvements in stone sawing machines and more particularly to means for clamping the work piece in stone and marble sawing machines in which several saw blades are parallelly stretched in a saw sash that is, a gang saw, which is arranged to reciprocate substantially reciprocating horizontally above the work piece to cut vertically down through it. A principal object of my invention is to provide means with the aid of which the stone or marble block in the sawing machine may be held firmly to the platform or like work carrier of the machine during the sawing operation, so that the block is not displaced by the forces to which it is subjected. In modern rapid-working stone sawing machines employing gang saws the work piece is subjected to such vibrations and shocks that it is not sufficient to rely merely upon the work piece, very heavy though it be, being retained in place on its support by its own weight.

This and other objects of my invention will appear from the following detailed description of a preferred form of my invention, as illustrated in the accompanying drawings, wherein Fig. 1 shows a longitudinal sectional elevation of a stone sawing machine provided with clamping means according to the invention, Fig. 2 is a cross sectional elevation of the stone sawing machine along the line A—A in Fig. 1 showing the clamping means in elevated position.

Fig. 3 is a similar cross sectional elevation of the machine as in Fig. 2 showing the clamping means in working position during the first part of the sawing operation; the saw blades of the machine having not yet passed through the top surface of the work piece, Fig. 4 is also a similar cross sectional elevation as in Fig. 2 showing the clamping means in reset working position after the saw blades have wholly passed through the top surface of the work piece, and Fig. 5 is a sectional plan view of the stone sawing machine taken along the line V—V in Fig. 3.

The stone sawing machine here referred to is substantially of the type described in my copending application Serial No. 103,977, filed July 11, 1949, now Patent No. 2,609,812, but may be of any other type having a substantially horizontally reciprocating saw sash with several longitudinally stretched saw blades, and, though the sawing machine shown in the drawings is provided with an elevatable work carrier or table, my invention may with substantially the same advantages, be used in a stone sawing machine having a stationary work table and a vertically adjustable saw sash.

Throughout the drawings, 1 designates the foundation for the sawing machine having uprights 2 on either side of an elevatable platform 3 serving as a work table. The uprights 2 are at their upper ends connected by a cross beam 4 carrying hinges 5 for two vertically suspended pendulums 6, one at either side of a substantially horizontal saw sash 7. The saw sash 7 is pivotally connected to the lower ends of the pendulums 6 by means of pins 8 and further, the saw sash 7 is provided with longitudinal extensions 9 at one end having their outer ends pivotally connected to a crank shaft 10 which is mounted in a support 11 on the foundation 1 at one end of the machine and carries a fly wheel 12 which is arranged to be rotated by means of a belt 13 and an electric motor 14. When the fly wheel 12 rotates the saw sash 7 is given a substantially horizontally reciprocating movement and simultaneously a longitudinal rocking motion by reason of the pendulums 6, the saw sash in Fig. 1 being shown at the end of one of its strokes.

The saw sash 7 comprises cross pieces 7' for maintaining its longitudinal frame portions apart and also serving as mountings for several longitudinally and parallelly stretched saw blades 15 in the saw sash 7. These saw blades 15 are stretched and mounted in a conventional manner by means of claws 16 and wedges 17, but they may of course be mounted in any other arbitrary way, which may be found more suitable.

The work table or platform 3 is elevatable, as mentioned before, to feed the stone or marble block 18 towards the saw blades 15 in the saw sash 7 during the sawing operation, and for that reason the platform is provided with guiding sledges 18' sliding along vertical guiding rails 19 in the foundation 1 and actuated by hydraulic lift jacks or hydraulic cylinders 3'. Of course, screw jacks or like lifting means may be substituted for these hydraulic jacks, but I prefer hydraulic ones because they permit uniform actuation of all parts of the table, because they may be connected to one common source of pressure.

The stone or marble block 20, i. e., the work piece, is located during the sawing operation on the work table or platform 3 and the block may rest on a bed 21 thereon, which preferably constitutes the platform of a truck (not shown) by means of which the block may be transported to and from the sawing machine.

It has previously been suggested to pour concrete around and under the bottom of the block 20 to anchor it to the work table, and though I also prefer to do so in particular cases, this method has proved to be unsatisfactory, particularly when toothed saw blades 15 are used, because of the severe vibrations and shocks to which the block is then subjected. I am also aware that it has previously been suggested to clamp the block in proper position by means of clamps at either end in the longitudinal direction of the saw sash, but clamps of this kind obviously disturb the transportation of the block to and from the machine work table. As the block is intended to be cut or sawed in thin disks or slabs it is quite impossible to apply any pressure to the lateral sides of the block because such a pressure would obviously break the disks as soon as the saw blades have passed the pressure point or points and furthermore such a pressure would not secure the disks or slabs cut in the middle of the block.

It may be pointed out that a perfect anchorage for the block to be sawn is of a great importance, because a bad anchorage causes the block to move during the sawing operation and causes the saw blades to cut inaccurately and at the same time to be subjected to lateral forces which may readily break them and particularly the teeth thereof; these teeth are often made of hard metal and thus very brittle although they are very hard and resistant to wear.

In accordance with this invention, these difficulties are overcome in the following manner:

At either lateral edge of the work table 3 I anchor two spaced vertical columns 22 and 23, the upper ends of which are connected by means of cross pieces 24 and 25 to the corresponding columns at the opposite edge of the work table 3. The columns and the corresponding cross pieces thus form two spaced and transverse arches or frames over the work table 3 and I prefer to place the columns inside the saw sash but outside the saw blades therein although this is not always suitable and in other sawing machines they may be located outside the saw sash. The columns 22 and 23 in each arch form guides for vertically slidable frameworks 26 and 27 respectively. These frameworks 26 and 27 are elongate and comprise two spaced and interconnected longitudinal bars the ends of which form forks embracing the columns 22 and 23 respectively. The ends of each framework further project beyond the columns to provide shoulders 28 by means of which the framework 26 or 27 may rest on the side members of the saw sash 7 as will be more clearly described later. The columns 22 and 23 are provided with holes 29 transversally to the frameworks 26 and 27 in which pin keys 30 may be inserted to lock the framework in selected vertical positions, as will also be described below, and the ends of the bars of the framework further form upwardly directed wedges 31 (Fig. 4), which, when the framework is in a locked position, cause a slight, inwardly directed stress assisting the cross pieces 24 and 25 in keeping the columns together.

Intermediate the columns the frameworks 26 and 27 are slotted between the bars and form mountings for two hydraulic jacks 32 (on framework 26) with individual pumps 32' and manometers, and one rack-and-pinion jack 33 (on framework 27) with crank 33'. Of course, all the jacks may be hydraulic or mechanical, but preferably they should be all individually controlled and actuated, because it could otherwise happen that one of them loses its grip and thereby causes all the others to do the same, particularly when they are all hydraulic ones and actuated from a common source of pressure. All the jacks 32 and 33 are mounted on the lower side of the respective frameworks by means of bolts 34 passing vertically between the bars of the frameworks and having their one ends secured to the top of the respective jack while their other ends pass through plates 35 resting on the upper side of the frameworks, wing nuts 36 being screwed on to their upper ends. By this arrangement each jack 32 or 33 is transversally adjustable over the work table 3 and may be locked in any suitable position.

The piston or rack in each jack 32 or 33 carries at its lower end a foot member which is adapted to rest on the block 20 during the sawing operation and, by means of the jack, to press the block firmly against the work table 3 and thus prevent it from sliding and rocking. Each foot member comprises two spaced parallel plates 37 substantially triangular in shape and adapted to rest on the block or work piece 20, the base of each plate or leg 37 being preferably provided with two toes 37' (Fig. 1), one near each corner. The plates 37 are vertical and near their upper ends they are firmly interconnected, their upper ends forming a fork member embracing the end of the jack piston or rack; this fork member is pivotally connected to said piston or rack end by means of a transverse bolt 38 and permits the foot member to swing in the plane of the plates for adjusting purposes. The plates 37 of each foot member are spaced apart a distance slightly exceeding the thickness of the saw blade used in the sawing machine and the free height of the plates 37 from their lower edge to their interconnection point is substantially or at least somewhat greater than the height of each saw blade in the machine, so that, when the foot member rests on the block or work piece, a saw blade may be longitudinally reciprocated above the block and between the plates of each foot member. The plane of each plate 37 is arranged in parallel with the plane of the saw blades in the saw sash of the machine.

By the aid of the means now described I clamp the work piece or block 20 to the work table 3 during the sawing operation in the following way:

I place the block 20 on the table 3 when the latter is lowered as shown in Fig. 2. The shoulders 28 of the frameworks 26 and 27 then rest on the side members of the saw sash 7 and carries the jacks 32 and 33 with their foot members 37 above the saw blades 15 in the saw sash 7. The jacks 32 and 33 are preset in suitable positions when the saw blades are stretched in the sash, so that the three jacks are substantially uniformly and triangularly spaced over the block to be sawn. It will be noted that when the frameworks rest on the saw sash and all the jacks are in retracted position the foot members do not rest on, but only embrace the saw blades as shown in Fig. 2.

The work table or platform 3 is then elevated by means of the hydraulic cylinders 3' so that the block 20 is fed towards the saw blades 15 in the saw sash 7. At this elevation the frameworks 26 and 27 still rest on the saw sash 7 but the columns 22 and 23 follow the table and when the block is about to engage the saw blades 15 the frameworks are locked to the columns by means of the pin keys 30, one below and one above each end of each framework. The jacks 32 and 33 are then actuated so that the foot members firmly press against the top surface of the block 20 and the sawing operation may be started, the saw blades cutting through the top surface of the block as shown in Fig. 3.

As soon as the saw blades have passed to the whole of their height through the top surface of the block, the jacks are temporarily loosened and a beam 39 or the like extending over the whole width of the block is placed under the foot members before the jacks are again caused to press against the block (Fig. 4). These beams 39 serve to distribute the pressure of the jacks over the whole width of the block and over all the disks sawn during the continued sawing operation. If necessary, plaster may be cast under the beams 39 to secure them to the block.

When the sawing operation is ended, the work table 3 is lowered as soon as the beams 39 have been removed and as the frameworks again rest on the saw sash the pin keys 30 are removed to let the frameworks free from the columns. A suitable signal system may be used to prevent the work table from being lowered too much before the frameworks are released so that a part or the whole of the weight of the work table and block will not be transferred to the saw sash which could possibly not withstand such a load.

This invention may be adapted for sawing machines having vertically adjustable saw sashes and a fixed work table as will be readily appreciated by anyone skilled in the art from the foregoing description although particular references to such an arrangement has not been given therein. Therefore I do not wish to be restricted as to the shape, size and arrangements of the parts except as set forth in the following claims.

I claim:

1. In a stone sawing machine of the type having a substantially horizontally reciprocating saw sash having a gang of longitudinally stretched saw blades therein and a work table for supporting the stone block to be sawn during the sawing operation, a number of vertically adjustable foot members adapted to engage the top surface of said block intermediate said saw blades, means for pressing said foot members against the top of said block for clamping it to said work table, and means on said work table for carrying said foot members and said pressing means above said block, each of said foot members comprising vertical plates parallel to said saw blades, said plates being hinged to said pressing means.

2. In a stone sawing machine of the type having a substantially horizontally reciprocating saw sash having a gang of longitudinally stretched saw blades therein and a work table for supporting the stone block to be sawn during the sawing operation, the provision of a number of vertically adjustable foot members adapted to engage the top surface of said block intermediate said saw blades, individually controlled jack means for pressing said foot members against the top of said block, and means secured on said work table for securing said foot members and jack means at an arbitrary level above said block for permitting said foot members and jack means to clamp said block to said work table, each of said foot members comprising two spaced parallel plates interconnected at their upper ends to form a fork, the shanks of which are spaced apart a distance exceeding the thickness of each of said saw blades and have a free height exceeding the height of each of said saw blades, whereby each said foot member is adapted to embrace one of said saw blades when engaging the top surface of the block.

3. In a stone sawing machine of the type having a substantially horizontally reciprocating saw sash having a gang of longitudinally stretched saw blades therein and a work table for supporting the stone block to be sawn during the sawing operation, the provision of a plurality of frames extending over said work table transversely to said saw sash, a plurality of vertically adjustable foot members adapted to engage the top surface of said block, and means intermediate said frames and said foot members for causing said foot members to clamp said block to said work table, said foot members comprising lower portions having a height exceeding the height of said saw blades and a width of less than the lateral distance between two adjacent saw blades, whereby said foot members engage the top of said block intermediate said saw blades.

4. In a stone sawing machine of the type having a substantially horizontally reciprocating saw sash having a gang of longitudinally stretched saw blades therein and a work table for supporting the stone block to be sawn during the sawing operation, the provision of a plurality of vertically adjustable foot members adapted to engage the top surface of said block intermediate said saw blades, means for pressing said foot members against the top of said block to clamp it to said work table, and means secured to said work table for carrying said foot members and said pressing means above said block, each of said foot members comprising vertical plates parallel to said saw blades.

BROR G. STÅLHEIM.

REFERENCES CITED

The following references are of record in the file of this patent:

UNITED STATES PATENTS

| Number | Name | Date |
|---|---|---|
| 936,748 | Wallner et al. | Oct. 12, 1909 |
| 2,135,047 | Carpenter | Nov. 1, 1938 |